(12) United States Patent
Hassibi

(10) Patent No.: US 6,600,796 B1
(45) Date of Patent: Jul. 29, 2003

(54) METHOD AND APPARATUS FOR RECEIVING WIRELESS TRANSMISSIONS USING MULTIPLE-ANTENNA ARRAYS

(75) Inventor: Babak Hassibi, Somerset, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/438,900

(22) Filed: Nov. 12, 1999

(51) Int. Cl.[7] ................................................ H04L 1/02
(52) U.S. Cl. ...................................................... 375/347
(58) Field of Search ................................. 375/316, 347, 375/349, 299, 142, 148; 455/132, 146, 149, 500, 101; 342/378

(56) References Cited

U.S. PATENT DOCUMENTS 6,188,352 B1 * 2/2001 Choi et al. .................. 342/378
6,301,293 B1 * 10/2001 Huang et al. ................ 375/130
6,304,750 B1 * 10/2001 Rashid-Farrokhi et al. . 455/137

OTHER PUBLICATIONS

Kailath, T. et al., *Linear Estimation*, Prentice–Hall, to be published Dec. 1999.

Dyer, P. et al., "Extensions of square–root filtering to include process noise," *Journal of Optimization Theory and Applications*, 3:444–459 (1969).

Golub, G.H. et al., *Matrix Computations*, 3d Ed., Johns Hopkins University Press, Baltimore, MD (1996).

* cited by examiner

Primary Examiner—Bayard Emmanuel
(74) Attorney, Agent, or Firm—Martin I. Finston

(57) ABSTRACT

A method is disclosed for signal detection in a wireless communication system that includes multiple-antenna arrays for transmission and reception. The method involves multiplying a vector of signals collected from respective receiving antennas by a nulling vector, such that the resulting vector product provides an estimated value corresponding to a specific one of the transmitted signals. A respective such multiplication is performed to detect each of the transmitted signals. In contrast to related methods of the prior art, each nulling vector is obtained from a channel matrix of estimated channel coefficients without performing any matrix inversion operations, and only a single pseudo-inverse related to the channel matrix is computed. As a result, numerical stability is improved and the computational complexity of the method is reduced by an order of magnitude relative to methods of the prior art.

7 Claims, 6 Drawing Sheets

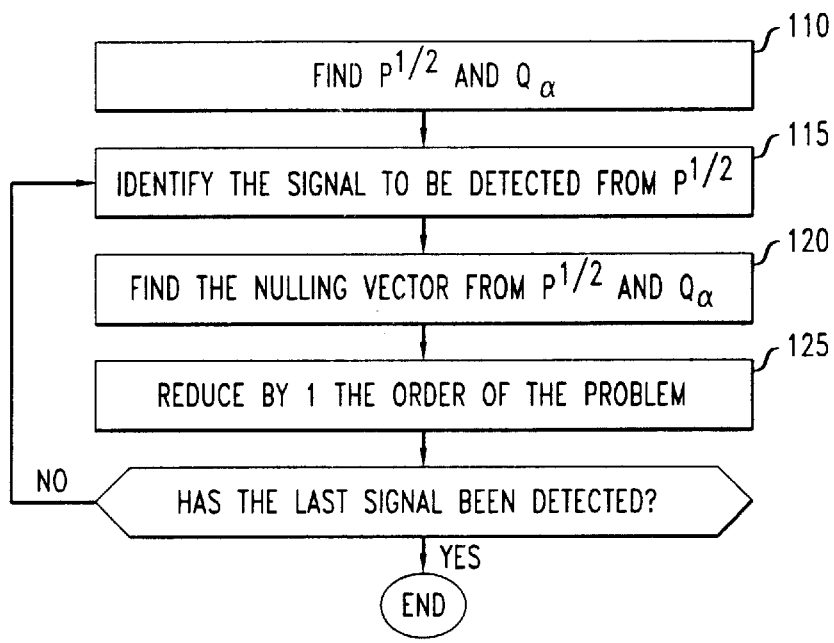

METHOD AND APPARATUS FOR RECEIVING WIRELESS TRANSMISSIONS USING MULTIPLE-ANTENNA ARRAYS

FIELD OF THE INVENTION

The invention relates to wireless, radio-frequency communication systems. More particularly, the invention relates to methods for receiving signals in digital wireless communication systems that use multiple-antenna arrays.

ART BACKGROUND

According to information-theoretic predictions, the factors determining the ultimate bit rate at which a digital wireless communication system may communicate data include: the total radiated power at the transmitter, the number of antenna elements at the transmitting and receiving sites, the bandwidth, the noise power at the receiver, and the characteristics of the propagation environment.

Most conventional systems use a single transmitting antenna element and a single receiving element. However, practitioners have recognized that substantial improvements in bit rate can be achieved by using multiple-antenna arrays for transmission, reception, or both. Such use of multiple-antenna arrays is discussed, for example, in the co-pending U.S. patent application Ser. No. 08/673981 by G. J. Foschini, commonly assigned herewith.

One known scheme for using multiple-antenna arrays is illustrated in FIG. 1. This scheme is meant to operate in a so-called "rich scattering environment," i.e., a signal-propagation environment in which the elements $H_{ij}$ of the channel matrix H may, to a reasonable approximation, be assumed statistically independent.

As shown in FIG. 1, transmitted signals $s_1, \ldots, s_M$ are respectively transmitted from M distinct antenna elements 10.1, ..., 10.M. The corresponding received signals $x_1, \ldots, x_N$ are respectively collected from N distinct antenna elements 15.1, ..., 15.N. In his scheme, the number M of transmitting antenna elements is at least 2, and the number of receiving elements is at least M. The transmission antenna elements 10.1, ..., 10.M ay represent a single array of elements that are driven in unison, or they may be independently driven antennas.

The channel matrix H is an N×M matrix in which the element in the ith row and jth column represents the coupling, through the propagation channel, between the ith receiving antenna element and the jth transmitting element.

The received signals $x_1, \ldots, x_N$ are processed in digital signal processor 20 to produce recovered signals $\hat{s}_1, \ldots, \hat{s}_M$. In effect, the processing in processor 20 inverts the coupling between the transmitting and receiving antennas as mediated by the propagation channel. The manner in which this inversion is carried out is described below. However, a perfect reconstruction of the transmitted signals is not generally possible. Therefore, it is typical to decode each of the recovered signals by seeking a best match (but not, generally, a perfect match) between the recovered signal and one of a predetermined constellation of possible symbol values. Practitioners sometimes refer to this decoding procedure as "slicing."

The flowchart of FIG. 2 summarizes an exemplary, known signal-detection procedure. At block 25, an estimate of the channel matrix elements is obtained by transmitting a sequence of known signals. Typically, a sequence of approximately 2M training vectors is transmitted. Each training vector consists of a respective signal value for transmission from each of the M transmission antenna elements. As will be appreciated by those skilled in the art, the rows of FFT (Fast Fourier Transform) matrices of appropriate dimension, for example, are useful as training vectors.

With further reference to FIG. 2, at block 30 a matrix denominated the pseudoinverse is derived from the channel matrix H. The pseudoinverse here corresponds to an augmented matrix that contains H as a sub-matrix. This derivation is described in further detail below. From the pseudoinverse, a further matrix, denominated the error covariance matrix, is derived. The error covariance matrix provides an indication of which is the strongest (as received) of the transmitted signals. If the strongest signal is detected first, the probability of error in detecting subsequent signals is reduced. Thus, it is optimal to detect first the strongest of all remaining undetected signals. Accordingly, the strongest signal is selected for detection.

At block 35, a vector denominated the nulling vector is derived from the pseudoinverse. The nulling vector is derived from that specific row of the pseudoinverse that corresponds to the signal selected for detection.

At block 40, the received signal vector $\vec{x} = (x_1, \ldots, x_N)$ is left-multiplied by the nulling vector. (It should be noted that $\vec{x}$ is a column vector.) The result is the recovered signal, representing a least-mean-squares estimate of the corresponding transmitted signal. Those skilled in the art will recognize that this procedure applies the principles of MMSE (Minimum Mean-Square Error) signal detection.

The procedure of block 40 is denominated nulling. The reason for this is that if there were no additive noise present at the receiver, left-multiplying $\vec{x}$ by the nulling vector would theoretically produce an exact replica of the desired signal. Thus, the effect of the other M−1 signals would have been nulled out.

At block 45, a slicing procedure is performed to identify the recovered symbol with a member of a symbol constellation.

At block 50, the effect of the detected signal is cancelled from the detection problem. The result of this step is a reduced-order problem, in which there is one fewer transmitted signal to be recovered. The procedure of blocks 30 to 50 is then iterated until all of the transmitted signals have been recovered and decoded. In each iteration, the optimal signal to be detected is the strongest of the remaining signals, as determined at block 30. It should be noted in this regard that the computational complexity of the procedures of blocks 30 and 35 scales as $M^3$. Due to the iterative loop, these procedures are iterated M times, leading to a total complexity that scales as $M^4$.

Although useful, the process of FIG. 2, as conventionally practiced, suffers certain limitations. One such limitation is that the computational complexity of the procedures of blocks 30 and 35, i.e., of determining the nulling vectors and optimal ordering, scales as the fourth power of the number M of transmitting antennas. For large transmitting arrays, e.g. for M of ten or more, these procedures may dominate the computation time, and may even lead to computation times that are prohibitive for real-time processing.

The process of FIG. 2, as conventionally practiced, contains numerous matrix squaring operations (e.g., products of a matrix and its conjugate transpose) and inversions that tend to increase the dynamic range of the quantities involved in the computations. As a consequence, these computations are prone to truncation error and may be numerically unstable. To minimize truncation error, it is preferable to carry out these computations in floating point arithmetic rather than fixed point arithmetic. On the other hand, fixed point arithmetic is advantageous in practical applications because it is compatible with fast and relatively inexpensive digital signal processors. Thus, a further limitation of conventional methods for carrying out the process of FIG. 2 is that they are not well-suited for implementation in processors using fixed point arithmetic.

SUMMARY OF THE INVENTION

I have discovered a new procedure for determining the nulling vectors and optimal ordering. My new procedure has a computational complexity that scales only as the third power of the number M of transmitting antennas. Moreover, matrix squaring operations and inversions are avoided completely in the new procedure. Instead, unitary transformations are heavily used. Those skilled in the art will appreciate that unitary transformations are among the most numerically stable operations used in numerical analysis. As a consequence of this shift from squaring and inversion operations to unitary transformations, the dynamic range of the computational quantities is reduced sufficiently for practical implementation, in at least some cases, in fixed point arithmetic.

A key part of my discovery is that the nulling vectors and the optimal ordering can be derived from a pair of matrices denominated $P^{1/2}$ and $Q_\alpha$ without matrix squaring operations or matrix inversions. The matrix product $P^{1/2} Q_\alpha^*$ (the symbol "*" denotes conjugate transposition) is equal to the pseudoinverse of a matrix that contains the channel matrix H as a sub-matrix. Thus, the derivation of $P^{1/2}$ and $Q_\alpha$ constitutes an implicit computation of the pseudoinverse.

The matrices $P^{1/2}$ and $Q_\alpha$ are obtained by propagating a matrix square-root algorithm whose only inputs are the rows of the channel matrix H and the reciprocal α of the average signal-to-noise ratio (assuming, without loss of generality, that the noise has unit power). In practice, the signal-to-noise ratio can be measured, e.g., by comparing the received power during transmission to the received power during periods of no transmission. In fact, I have found that my new signal-detection procedure is not very sensitive to the value of α, provided it lies within the range 15–25 dB.

To implement the square-root algorithm, it is also necessary to introduce an appropriate unitary matrix which is selected, as explained below, in accordance with the values of the inputs. Transformation of $P^{1/2}$ and $Q_\alpha$ by a further, appropriately selected unitary matrix provides values to insert in a simple formula for calculating the nulling vector for the next signal whose detection is "optimal." After each nulling vector has been obtained, the effect of the newly detected signal is cancelled from the remaining detection problem, the dimensionality of $P^{1/2}$ and $Q_\alpha$ is reduced, and a new transformation is applied. This procedure is iterated until all of the nulling vectors have been obtained.

Significantly, $P^{1/2}$ and $Q_\alpha$ are derived only once, and thus there is only one effective computation of a pseudoinverse. The absence of matrix inversion operations in this approach improves numerical stability. Because the pseudoinverse is only computed once, the computational complexity is reduced by an order of magnitude relative to methods of the prior art.

BRIEF DESCRIPTION OF THE DRAWING

FIG. 4 is a high-level flowchart of a procedure, according to the invention in one embodiment, for/detecting received signals in the communication system of FIG. 1.

FIG. 5 is an annotated matrix equation, illustrating the relationship between various matrices invoked in the procedure of FIG. 4.

DETAILED DESCRIPTION

Figure 1:
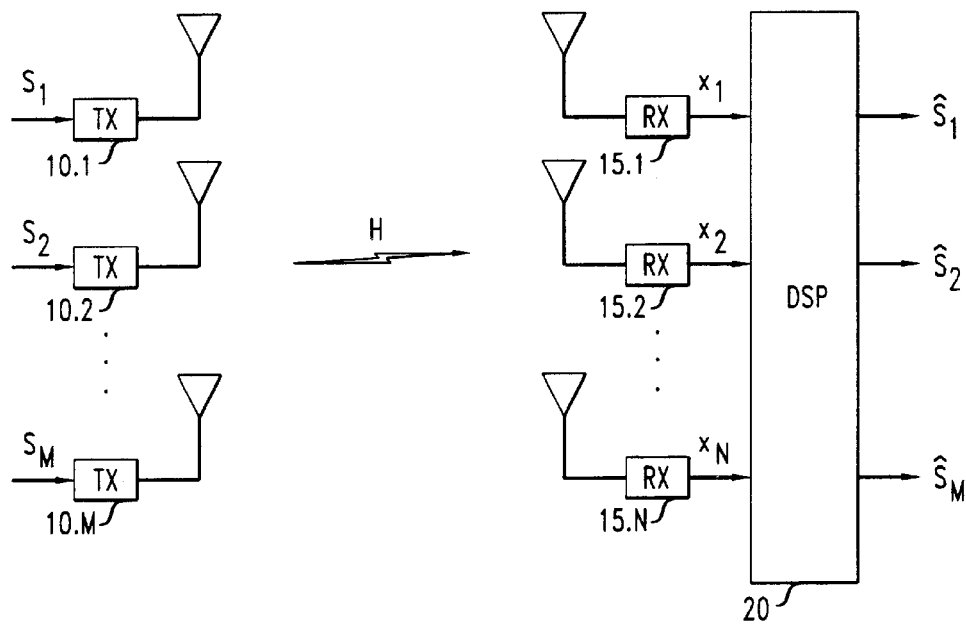
FIG. 1 is a schematic representation of a wireless communication system using multiple transmitting antenna elements and multiple receiving antenna elements.
Figure 2:
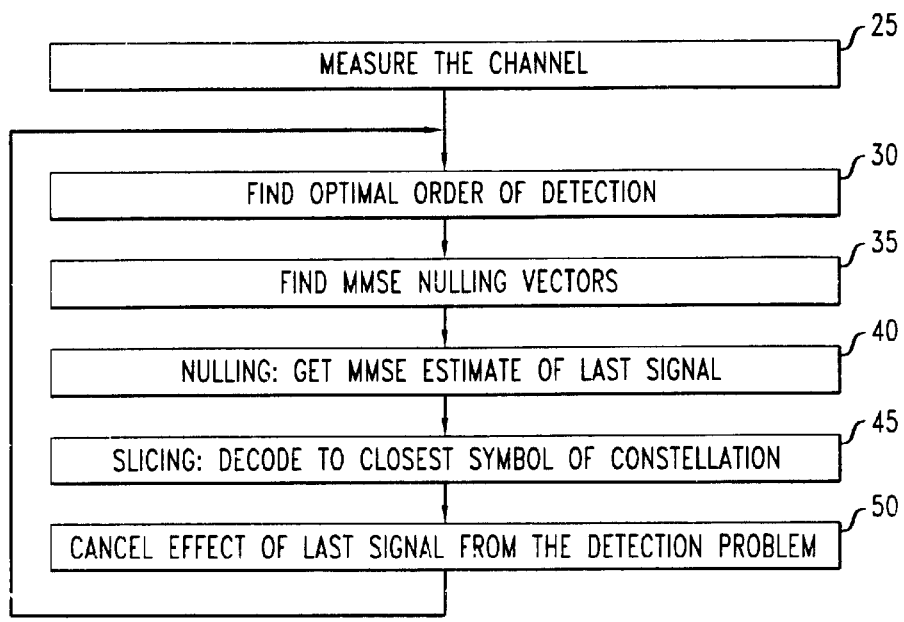
FIG. 2 is a high-level flowchart of a procedure of the prior art for detecting and decoding received signals in the communication system of FIG. 1.
Figure 3:
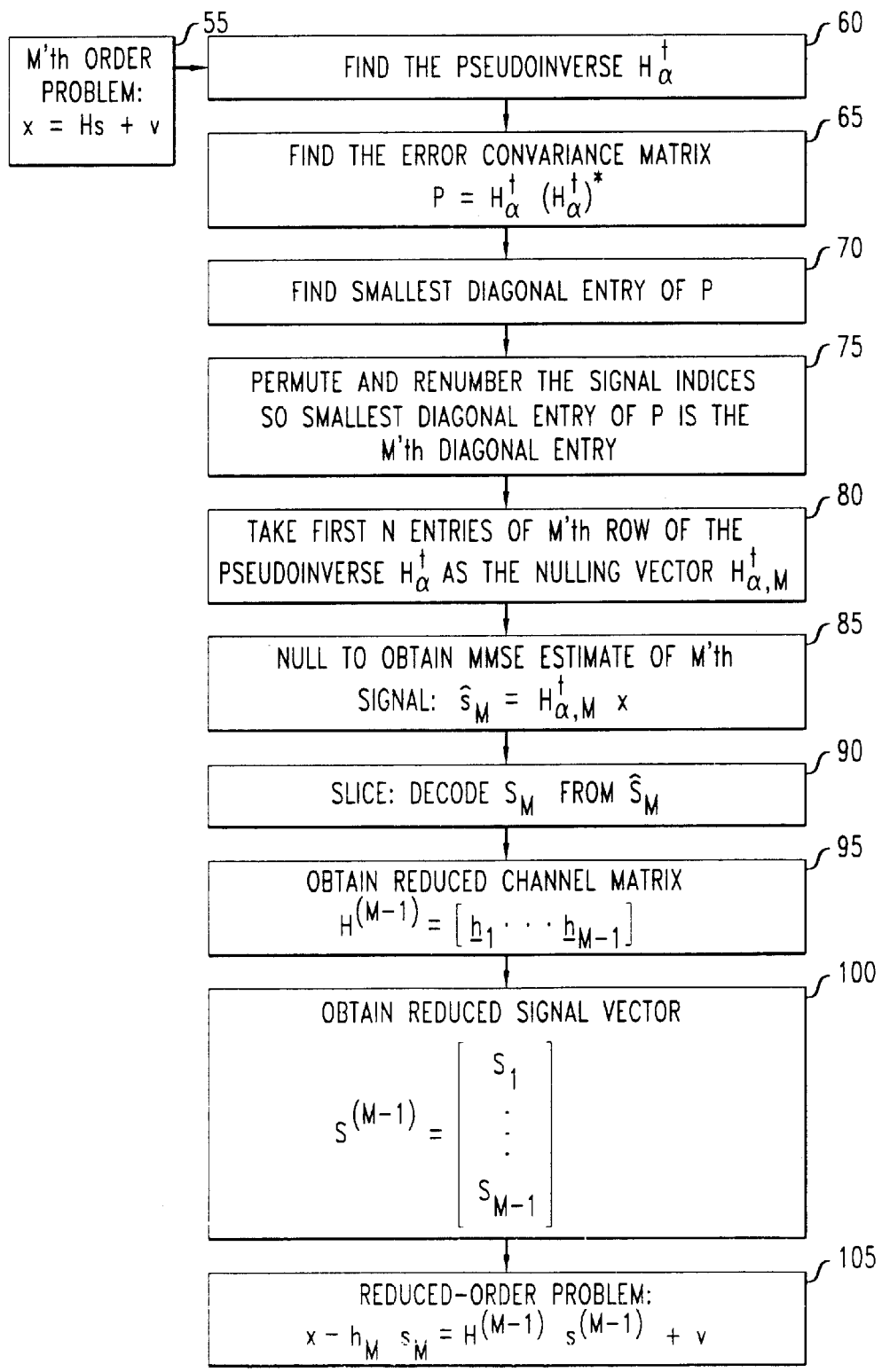
FIG. 3 is a flowchart illustrating the procedure of FIG. 2 at a higher level of detail.

With reference to FIG. 3, I will first recapitulate, in greater detail, the detection procedure of FIG. 2 which, as noted, is a known procedure. As indicated at block 55, the problem is initially an M'th order problem, because a vector $\vec{s}$ of M transmitted signals needs to be recovered from the vector $\vec{x} = H\vec{s} + \vec{v}$ of N received signals. The symbol $\vec{v}$ represents additive receiver noise.

At block 60, the pseudoinverse $$H_\alpha^\dagger = \left[ \begin{array}{c} H \\ \sqrt{\alpha}\, I_M \end{array} \right]^\dagger$$

is formed. In this and following expressions, the symbol "†" denotes matrix pseudoinversion. The symbol $I_M$ denotes the M×M identity matrix. Significantly, the step of block 60 involves a matrix inversion. At block 65, the error covariance matrix $P = H_\alpha^\dagger (H_\alpha^\dagger)^*$ is formed. In this and following expressions, the symbol "*" denotes conjugate transposition. Significantly, the step of block 65 involves a matrix squaring operation. At block 70, the smallest diagonal entry of P is identified. This entry identifies the signal that is strongest, and thus optimal as the next signal to be detected.

At block 75, the indices 1, . . . , M of the transmitted signals are permuted and renumbered, so that the strongest signal (as indicated by the smallest diagonal entry of P) is the M'th signal. The columns of H and rows of $H_\alpha^\dagger$ are permuted accordingly.

At block 80, a vector $H'_{\alpha M}$, consisting of the first N entries of the M'th row of the pseudoinverse (as permuted in block 75) is taken as the nulling vector. At block 85, the MMSE estimate of the M'th signal is obtained by applying the nulling vector to the vector of received signals: $\hat{s}_M = H_{\alpha,M}^\dagger \vec{x}$. At block 90, $\hat{s}_M$ is decoded in a slicing procedure, as described above.

At blocks 95–105, the effect of the M'th transmitted signal $s_M$ is cancelled from the M'th order problem to obtain a reduced-order problem of order M−1. Specifically, at block 95, a reduced channel matrix is obtained by deleting the M'th column of H: $H^{(M-1)} = [\vec{h}_1 \ldots \vec{h}_{M-1}]$, where $H^{(M-1)}$ is the reduced channel matrix, and $\vec{h}_1, \ldots, \vec{h}_{M-1}$ are the first M−1 columns of H. At block 100, a reduced signal vector $\vec{s}^{(M-1)}$ is defined by deleting the M'th signal from the original transmitted signal vector $\vec{s}$ (as permuted); i.e., $\vec{s}^{(M-1)} = [s_1 \ldots s_{M-1}]$. At block 105, the reduced-order problem is defined by: $\vec{x} - \vec{h}_M s_M = H^{(M-1)} \vec{s}^{(M-1)} + \vec{v}$, where $\vec{x} - \vec{h}_M s_M$ is a reduced received signal vector—i.e., the result of cancelling the effect of $s_M$ from the original received signal vector—and $\vec{v}$ is a term representing unknown additive receiver noise.

Blocks 60–105 are iterated for the reduced-order problem of order M−1, and likewise for each succeeding reduced-order problem, until the last signal is detected and decoded. Each iteration proceeds in the same manner as the preceding iteration. For simplicity, an indication of the iterative loop has been omitted from FIG. 3.

I will now describe my new signal-detection procedure. The new procedure is summarized at a broad conceptual level in FIG. 4. As shown at block 110 of the figure, the matrices $P^{1/2}$ and $Q_\alpha$ are obtained. At block 115, the next signal to be detected is determined from the matrix $P^{1/2}$. At block 120, the matrices $P^{1/2}$ and $Q_\alpha$ are used to obtain the current nulling vector, which is used for signal detection as described below. At block 125, the order of the problem is reduced by 1, by replacing $P^{1/2}$ by a sub-matrix of itself, and replacing $Q_\alpha$ by a sub-matrix of itself. The steps represented by blocks 115–125 is iterated until the last signal has been detected.

FIG. 5 illustrates the relationship between the channel matrix H and the matrices $P^{1/2}$ and $Q_\alpha$. Those skilled in the art will appreciate that according to the well-known QR decomposition theorem, the (N+M)×M matrix $$\begin{bmatrix} H \\ \sqrt{\alpha}\, I_M \end{bmatrix}$$

can be factored as the product of an (N+M)×M unitary matrix Q and an M×M invertible matrix R. That is, $$\begin{bmatrix} H \\ \sqrt{\alpha}\, I_M \end{bmatrix} = QR.$$

The matrix $Q_\alpha$ is the N×M submatrix consisting of the first N rows of the Q. Thus, $$Q = \begin{bmatrix} Q_\alpha \\ Q_2 \end{bmatrix},$$

where the symbol $Q_2$ represents the last M rows of Q. The matrix $P^{1/2}$ is the matrix inverse of R. That is, $P^{1/2} = R^{-1}$. Significantly, the pseudoinverse $H_\alpha^\dagger$ is equal to the matrix product $P^{1/2} Q_\alpha^*$, and the error covariance matrix P is equal to the matrix product $P^{1/2}(P^{1/2})^*$. It should be noted that according to my new procedure, the matrices $P^{1/2}$ and $Q_\alpha$ are not obtained directly from the QR decomposition, since this would require the inversion of R. Instead, they are obtained using an iterative procedure, described below, which employs unitary transformations to achieve reduced complexity and improved numerical stability.

Figure 6:
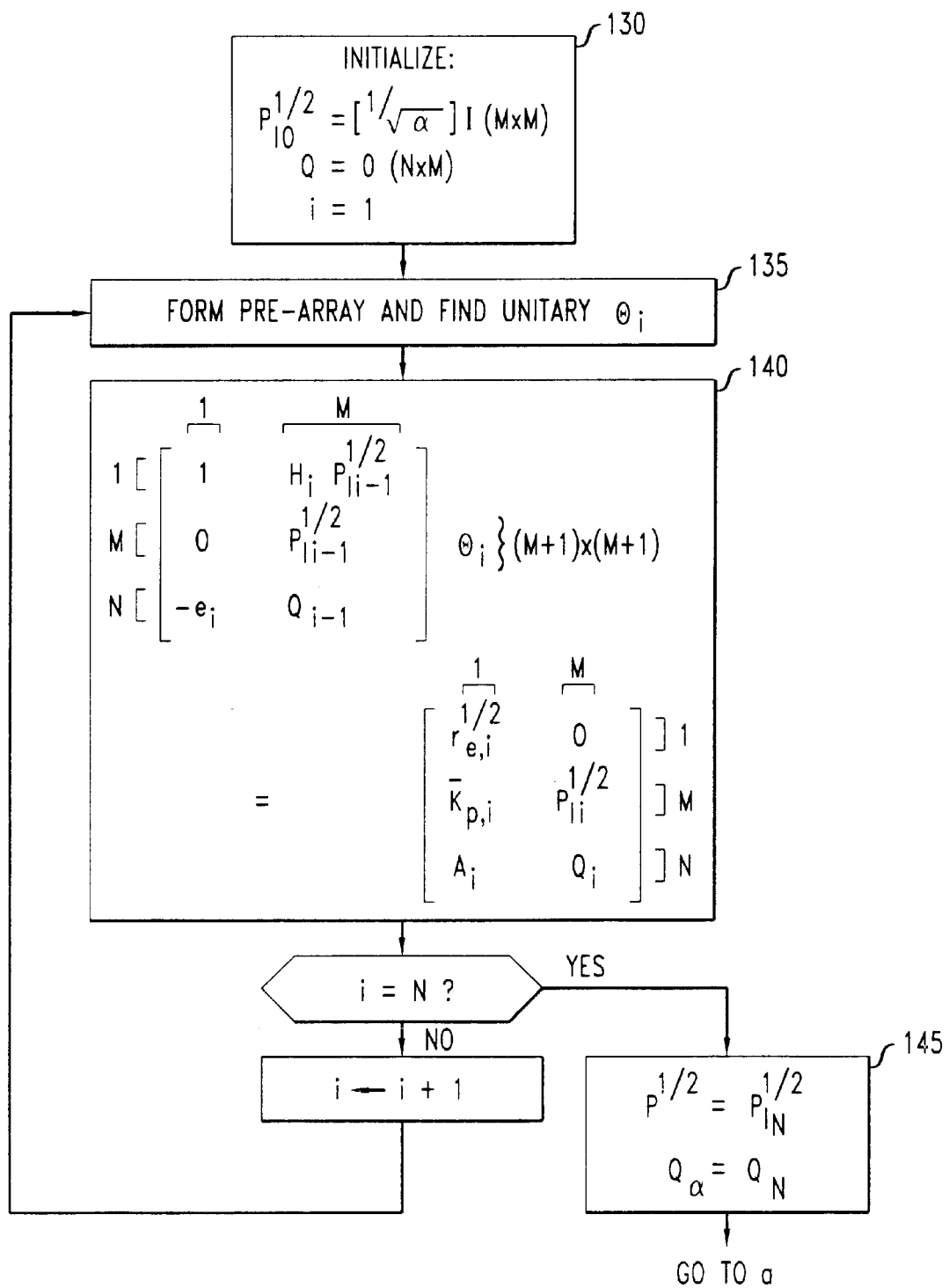
FIG. 6 is a flowchart illustrating the propagation of a matrix square-root algorithm. This procedure corresponds to block 110 of FIG. 4.

The iterative procedure for obtaining the matrices $P^{1/2}$ and $Q_\alpha$ is illustrated in FIG. 6. This procedure is of a type referred to as a "square-root algorithm."

In a square-root algorithm, a matrix multiplication of the form $X_i \Theta_i = Y_i$ is performed in each of set of iterations indexed by i. Each $\Theta_i$ is a unitary transformation that introduces zeroes into prescribed entries of the post-array $Y_i$. After each iteration, certain values taken from the post-array $Y_i$ are fed back as elements of the pre-array $X_{i+1}$ for the next iteration. The iteration of these matrix multiplications is referred to as "propagating" the algorithm. Square-root algorithms are described, for example, in Chapter 12 of T. Kailath, A. H. Sayed, and B. Hassibi, *Linear Estimation*, Prentice-Hall, to be published December 1999. An early reference on the subject of square-root algorithms is P. Dyer and S. McReynolds, "Extensions of square-root filtering to include process noise," *Journal of Optimization Theory and Applications*, 3:444–459 (1969).

Turning now to the procedure illustrated in FIG. 6, in each iteration i, i=1, ..., N, matrices $P_{|i}^{1/2}$ and $Q_i$ are updated. After the N'th iteration, $P^{1/2}$ is set equal to $P_{|N}^{1/2}$ and $Q_\alpha$ is set equal to $Q_N$, as indicated at block 145 of the figure.

As shown at block 130 of the figure, $P_{|i}^{1/2}$ is initialized by setting $$P_{|0}^{1/2} = \frac{1}{\sqrt{\alpha}} I,$$

where I is the M×M identity matrix, and $Q_i$ is initialized by setting $Q_0 = 0_{N \times M}$, where $0_{N \times M}$ is an N×M matrix whose entries are all zeroes.

At block 140, a matrix multiplication of the form $X_i \Theta_i = Y_i$ is performed. The pre-array $X_i$ is a (N+M+1)×(M+1) matrix defined by $$X_i = \begin{bmatrix} 1 & H_i P_{|i-1}^{1/2} \\ 0_M & P_{|i-1}^{1/2} \\ -e_i & Q_{i-1} \end{bmatrix},$$

where $0_M$ is a column vector all of whose M entries are zeroes, and $e_i$ is the i'th unit column vector of dimension N. In each iteration i of block 140, $H_i$ is the corresponding i'th row of the channel matrix H.

In each iteration i, the corresponding matrix $\Theta_i$ is any unitary transformation that block lower triangularizes the pre-array $X_i$. By "block lower triangularizes," I mean that the last M entries of the first row of the (N+M+1)×(M+1) post-array $Y_i$ must be all zeroes. Suitable methods for finding such a unitary transformation such as those using Householder reflections or a sequence of Givens rotations are well known. They can be found, for example, in G. H. Golub and C. F. Van Loan, *Matrix Computations*, 3d Ed., Johns Hopkins University Press, Baltimore, Md, 1996, or in T. Kailath, A. H. Sayed, and B. Hassibi, *Linear Estimation*, cited above. The determination of an appropriate unitary transformation is indicated in the figure at block 135.

Various sub-matrices of the post-array $Y_i$ are identified in the following equation:

$$Y_i = \begin{bmatrix} r_{e,i}^{1/2} & 0^M \\ \overline{K}_{p,i} & P_{|i}^{1/2} \\ A_i & Q_i \end{bmatrix}.$$

The sub-matrices $P_{|i}^{1/2}$ and $Q_i$ have been defined above. As noted, $0^M$ is an M-dimensional row vector of zeroes. The symbols $r_{e,i}^{1/2}$, $\vec{K}_{p,j}$, and $A_i$ represent, respectively, a scalar, an M-dimensional column vector, and an N-dimensional column vector. The symbols $r_{e,i}^{1/2}$ and $\vec{K}_{p,i}$ are well known to those practiced in Kalman filter theory, in which they relate, respectively, to the innovations variance and the Kalman gain. The symbol $A_i$ is an arbitrary symbol used here to denote the lower left-hand corner of the post-array $Y_i$.

Thus, after each iteration of block 140, the new values of the sub-matrices $P_{|i}^{1/2}$ and $Q_i$ and the next row of the channel matrix H are fed back into $X_i$ for the next iteration. As noted, the values of $P_{|i}^{1/2}$ and $Q_i$ after the last, i.e., the N'th, iteration give the desired values of $P^{1/2}$ and $Q_\alpha$ as indicated at block 145.

As noted, this computation of $P^{1/2}$ and $Q_\alpha$ constitutes an effective computation of the pseudoinverse $H_\alpha^\dagger$. Significantly, such an effective computation takes place in our method only once.

Figure 7:
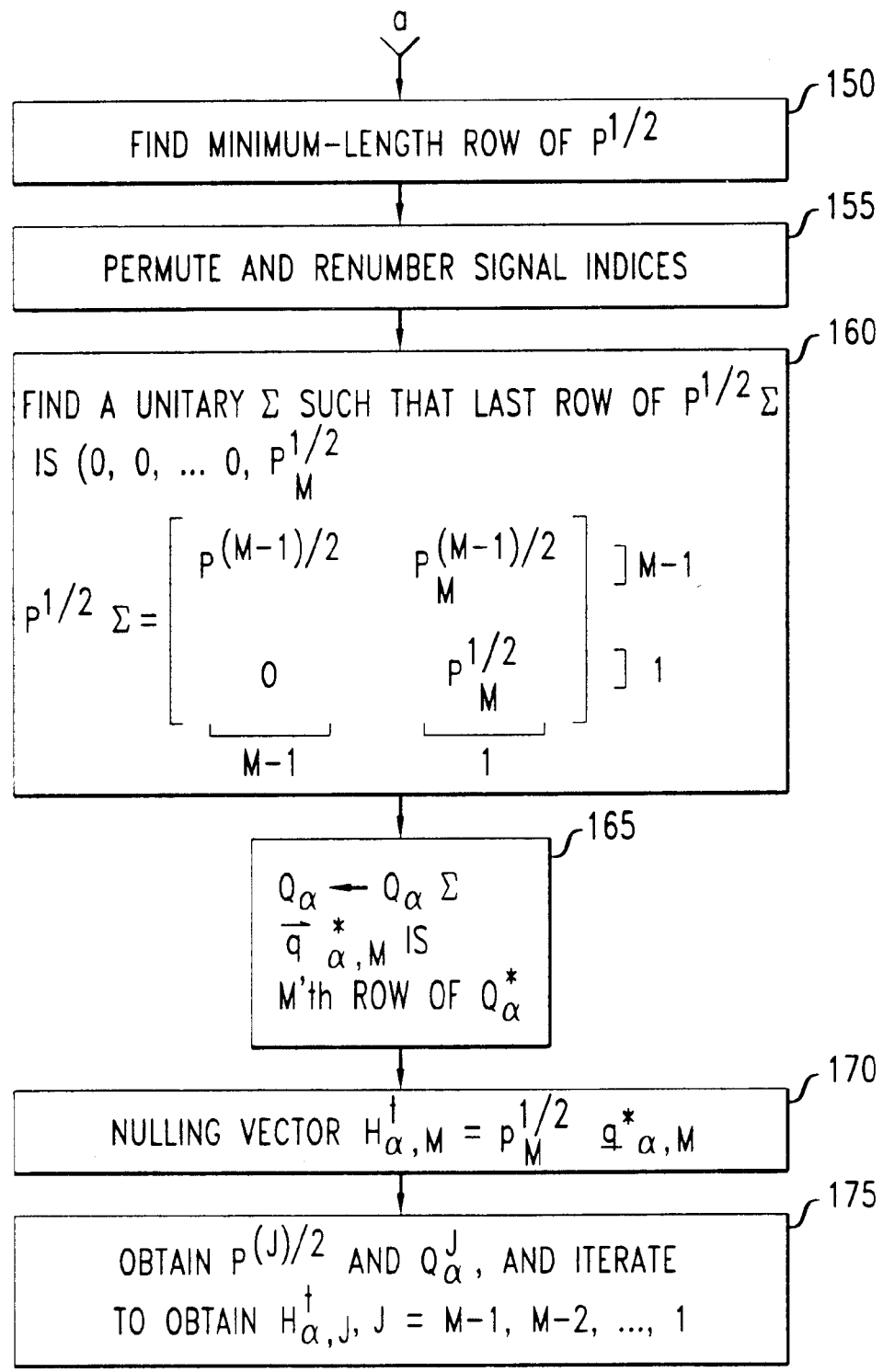
FIG.7 is a flowchart illustrating a procedure for obtaining nulling vectors in accordance with the invention in one embodiment. This figure shows further details of blocks 115–125 of FIG. 4, but does not explicitly show the application of the nulling vectors for detecting signals.

FIG. 7 illustrates how the matrices $P^{1/2}$ and $Q_\alpha$ are used to obtain the nulling vectors $H_{\alpha,j}^\dagger$, J=1, . . . , M. At block 150, the minimum-length row of the matrix $P^{1/2}$ is identified. This identifies the optimal signal to be detected in the present iteration. At block 155, the signal indices are permuted and renumbered so that the selected optimal signal will be the M'th signal. The rows of H are permuted accordingly.

At block 160, a unitary transformation $\Sigma$ is found that block upper triangularizes the matrix $P^{1/2}$. That is, $\Sigma$ is any unitary transformation for which the first M−1 entries of the last (i.e., the M'th) row of the matrix product $P^{1/2}\Sigma$ are all zeroes. As noted above for lower triangularizing transformations, an appropriate transformation $\Sigma$ is readily found using standard techniques.

Various sub-matrices of the M×M matrix $P^{1/2}\Sigma$ are identified in the following $$P^{1/2}\Sigma = \begin{bmatrix} P^{(M-1)/2} & P_M^{(M-1)/2} \\ 0^{M-1} & p_M^{1/2} \end{bmatrix}.$$

In the preceding expression, $P^{(M-1)/2}$ is a sub-matrix of dimension (N−1)×(N−1), $P_M^{(M-1)/2}$ is a column vector of dimension M−1, $0_{M-1}$ is a row vector of dimension M−1, and $P_M^{1/2}$ is a scalar. As explained below, $P_{(M-1)/2}$ will take the place of $P^{1/2}$ in the next iteration of block 160. The scalar $p_M^{1/2}$ will be used to obtain the M'th nulling vector.

After the unitary transformation Y is obtained in block 160, it is used to transform the matrix $Q_\alpha$ as indicated in the figure at block 165. That is, the value of $Q_\alpha$ is updated to $Q_\alpha\Sigma$. As also indicated at block 165, the conjugate transpose $Q_\alpha^*$ of the updated matrix $Q_\alpha$ is obtained, and the M'th row of $Q_\alpha$, denoted $\vec{q}_{\alpha,M}^*$, is obtained.

As indicated at block 170, the M'th nulling vector $H_{\alpha,M}^\dagger$ is obtained as the product $p_M^{1/2}\vec{q}_{\alpha,M}^*$. As indicated at block 175, the procedure of blocks 150–170 is iterated to obtain the remaining M−1 nulling vectors $H_{\alpha,j}^\dagger$, j=M−1, . . . , 1. In each iteration of blocks 150 and 155, the signal indices are permuted and renumbered so that the minimum-length row of the current update of $P^{1/2}$, now denoted $P^{(J)/2}$, is the J'th row. In each iteration of block 160, a unitary transformation $\Sigma$ is found such that the last row of $P^{(J)/2}\Sigma$ has all zero entries except for the last, i.e., the J'th entry, which is the scalar $p_j^{1/2}$. At each iteration of block 165, the vector $\vec{q}_{\alpha,j}$ is obtained as the J'th row of $Q_\alpha^*$. In each iteration of block 170, the J'th nulling vector $H_{\alpha,j}^\dagger$ is obtained as the product $p_j^{1/2}\vec{q}_{\alpha,j}^*$.

At the beginning of each iteration of blocks 150–170, the value of $P^{(J)/2}$ is updated to the sub-matrix in the upper left corner of the matrix $P^{(J)/2}\Sigma$ of the previous iteration. That is, the new value of $P^{(J)/2}$ is given by the first J−1 rows of the first J−1 columns of the previous $p^{(J)/2}\Sigma$. Thus, as noted, the updated $P^{(J)/2}$ used for obtaining the (M−1)'th nulling vector is $P^{(M-1)/2}$.

The value of $Q_\alpha$ is also updated at the beginning of each iteration of blocks 150–170. The updated values of $Q_\alpha$ are denoted $Q_\alpha^J$, J=M−1, . . . , 1. Each $Q_\alpha^J$ is obtained by deleting the last column of the previous $Q_\alpha^J$ as transformed at block 165 of the previous iteration. Thus, for example, the updated $Q_\alpha$ used for obtaining the (M−1)'th nulling vector is denoted $Q_\alpha^{M-1}$, and it consists of the first M−1 columns of the original $Q_\alpha$ as updated at block 165.

Significantly, the repeated block upper triangularizations of $P^{(J)/2}$ are equivalent to an upper triangularization of $P^{1/2}$. As a consequence, each scalar coefficient $p_j^{1/2}$ may be thought of as a diagonal element of the upper triangularized $P^{1/2}$. Moreover, since each block upper triangularization is achieved by applying a unitary transformation, each of the vectors $\vec{q}_{\alpha,j}^*$ is either a row of $Q\alpha^*$ or of an image of $Q\alpha^*$ under a unitary transformation.

Figure 8:
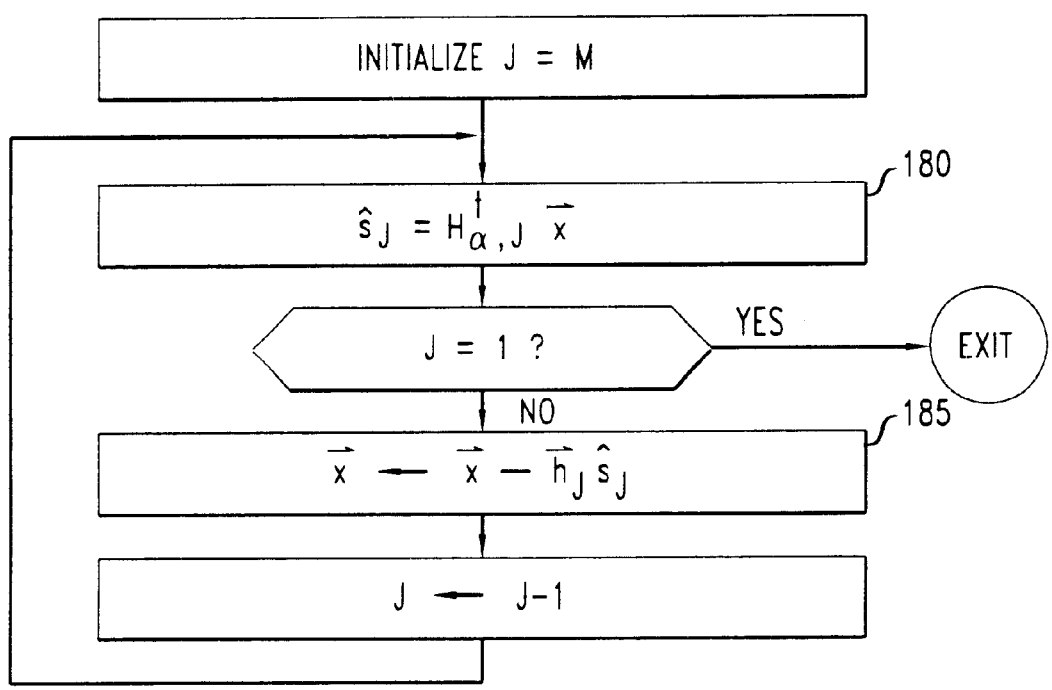
FIG. 8 is a flowchart illustrating the detection of signals by applying nulling vectors obtained according, e.g., to the procedure of FIG. 7. For simplicity of presentation, the detection process has been shown in FIG. 8 as occupying a separate loop that follows the last iteration of the steps of FIG. 7. Those skilled in the art will appreciate that as an alternative, each signal detection can be carried out as part of a corresponding iteration of the steps of FIG. 7.

As noted, each iteration of block 170 produces a respective nulling vector $H_{\alpha,j}^\dagger$. FIG. 8 illustrates how the nulling vectors are used to obtain respective detected signals $\hat{s}_j$. As indicated at block 180, each detected signal is obtained from the vector product of the corresponding nulling vector with the vector $\vec{x}$ of received signals; i.e., $\hat{s}=H_{\alpha,j}^\dagger\vec{x}$. Significantly, before being used for the next detection, the vector $\vec{x}$ is modified to cancel the effects of the last-detected signal. This is shown at block 185, where after detecting the J'th signal, J=M, . . . , 1, the vector $\vec{x}$ is updated to $\vec{x} = \vec{h}_j\hat{s}_j$. In the preceding expression, the vector $\vec{h}_j$ represents that column of the channel matrix H that corresponds to the J'th signal.

It should be noted that the unitary transformations $\Theta_i$ and $\Sigma$ are readily performed using, e.g., Householder reflections or sequences of Givens rotations as described, e.g., in G. H. Golub and C. F. Van Loan, *Matrix Computations*, cited above. In hardware, a sequence of Givens rotations can be implemented using division-free methods, such as the CORDIC method, as described, e.g., in the above-cited book by Golub and Van Loan. Such a sequence can also be parallelized by means of a systolic-array-type architecture.

It should be noted further that the signal-detection method described here is readily generalized to take into account updates to the channel matrix. In such a case, the optimal detection ordering of the signals may change due to changes in the channel coefficients.

Those skilled in the art will appreciate that the procedures described above are readily implemented using computational devices of various kinds, including a digital computer operating under the control of an appropriate software program, a digital signal processor operating under the control of an appropriate program implemented in software, hardware, or firmware, and other, special-purpose, digital electronic circuits.

It should be noted that the specific computational steps described here are merely illustrative, and are not meant to limit the scope of the invention. Variations in the order and grouping of computational steps, as well as alternate computational approaches that lead to substantially the same results as the broad steps that are described here are meant to fall within the scope of the invention.

What is claimed is:

1. A method for detecting at least two transmitted signals transmitted by respective transmitting antenna elements, comprising:
   a) collecting at least two received signals from respective receiving antenna elements;
   b) multiplying a vector of said at least two received signals by a nulling vector, thereby to provide an estimated value corresponding to a specific one of said at least two transmitted signals, resulting in detection of the specific transmitted signal;
   c) at least partially cancelling the effect of said at least two the detected signal from the vector of received signals; and
   d) repeating step (b) in a preferred order until a respective said estimated value has been provided corresponding to each of the at least two transmitted signals;
CHARACTERIZED IN THAT
   e) the preferred ordering and each nulling vector are obtained from a channel matrix H of estimated channel coefficients;
   f) the obtaining of each of the nulling vectors and of the preferred ordering comprises effectively computing precisely one pseudoinverse that relates to the channel matrix H; and
   g the pseudoinverse is effectively computed without performing any matrix inversion operations.

2. The method of claim 1, wherein the preferred ordering is determined from a matrix $P^{1/2}$ which is related to an error covariance matrix according to the relation $P^{1/2}(P^{1/2})^* = P$, wherein * denotes conjugate transposition.

3. The method of claim 2, wherein the effective computation of the pseudoinverse, denoted $H_\alpha^\dagger$, comprises computing $P^{1/2}$ and a further matrix $Q_\alpha$ having the property that $P^{1/2} Q_\alpha^* = H_\alpha^\dagger$.

4. The method of claim 3, wherein each of the nulling vectors is derived from $P^{1/2}$ and $Q_\alpha$.

5. The method of claim 4, wherein:
   the obtaining of each of the nulling vectors and of the preferred ordering comprises effectively triangularizing $P^{1/2}$;
   each of the nulling vector is obtained from the product of a scalar coefficient and a vector;
   each said scalar coefficient is a diagonal element of the triangularized $P^{1/2}$; and
   each said vector is a row of $Q_\alpha^*$ or of the image of $Q_\alpha^*$ under a unitary transformation.

6. The method of claim 3, wherein the matrices $P^{1/2}$ and $Q_\alpha$ are derived from H by propagating a matrix square-root algorithm.

7. The method of claim 3, wherein $H_\alpha^\dagger$ is the pseudoinverse of an augmented matrix that contains the channel matrix H as a sub-matrix.

* * * * *